(12) United States Patent
Dutson et al.

(10) Patent No.: US 6,306,060 B1
(45) Date of Patent: Oct. 23, 2001

(54) COOLING FLUID SUPPLY TO HYDRAULICALLY ACTUATED ROLLERS IN A CONTINUOUSLY-VARIABLE-RATIO TRANSMISSION

(75) Inventors: Brian Joseph Dutson, Manchester; Andrew Damian De Freitas, Wigan, both of (GB)

(73) Assignee: Torotrak (Development) Limited, Lancashire (GB)

( * ) Notice: Subject to any disclaimer, the term of this patent is extended or adjusted under 35 U.S.C. 154(b) by 0 days.

(21) Appl. No.: 09/660,513

(22) Filed: Sep. 12, 2000

Related U.S. Application Data

(63) Continuation of application No. PCT/GB99/01273, filed on Apr. 26, 1999.

(30) Foreign Application Priority Data

Apr. 27, 1998 (GB) ................................. 9808946

(51) Int. Cl.$^7$ ............................. F16H 15/38; F16H 57/04
(52) U.S. Cl. ........................... 476/8; 476/10; 476/14; 476/42
(58) Field of Search ............................. 476/8, 9, 10, 14, 476/42

(56) References Cited

U.S. PATENT DOCUMENTS

| | | | |
|---|---|---|---|
| 3,828,618 | * 8/1974 | Sharpe et al. | 476/10 X |
| 5,564,993 | * 10/1996 | Robinson | 476/10 |
| 5,971,885 | * 10/1999 | Greenwood et al. | 476/8 |
| 5,971,886 | * 10/1999 | Yamamoto | 476/10 |
| 5,989,150 | * 11/1999 | Yamamoto | 476/8 |

FOREIGN PATENT DOCUMENTS

| | | |
|---|---|---|
| 1 191 214 | 5/1970 | (GB) . |
| 2 282 196 | 3/1995 | (GB) . |
| WO 97/37156 | 10/1997 | (WO) . |

* cited by examiner

*Primary Examiner*—Allan D. Herrmann
(74) *Attorney, Agent, or Firm*—Nixon & Vanderhye P.C.

(57) ABSTRACT

A roller control unit for a CVT includes a cylinder (54) having a piston (70) positioned therein and operably connected to a roller assembly of said CVT thereby to control its position. The unit includes a lubrication supply which comprises a chamber (94) between the cylinder (54) and piston (70) and one or more radially extending passageways (102) through said piston (70). These passageways are in flow communication with the roller and act to direct cooling fluid to said roller. Radial supply of said lubrication facilitates a reduction in flow losses within the supply.

17 Claims, 4 Drawing Sheets

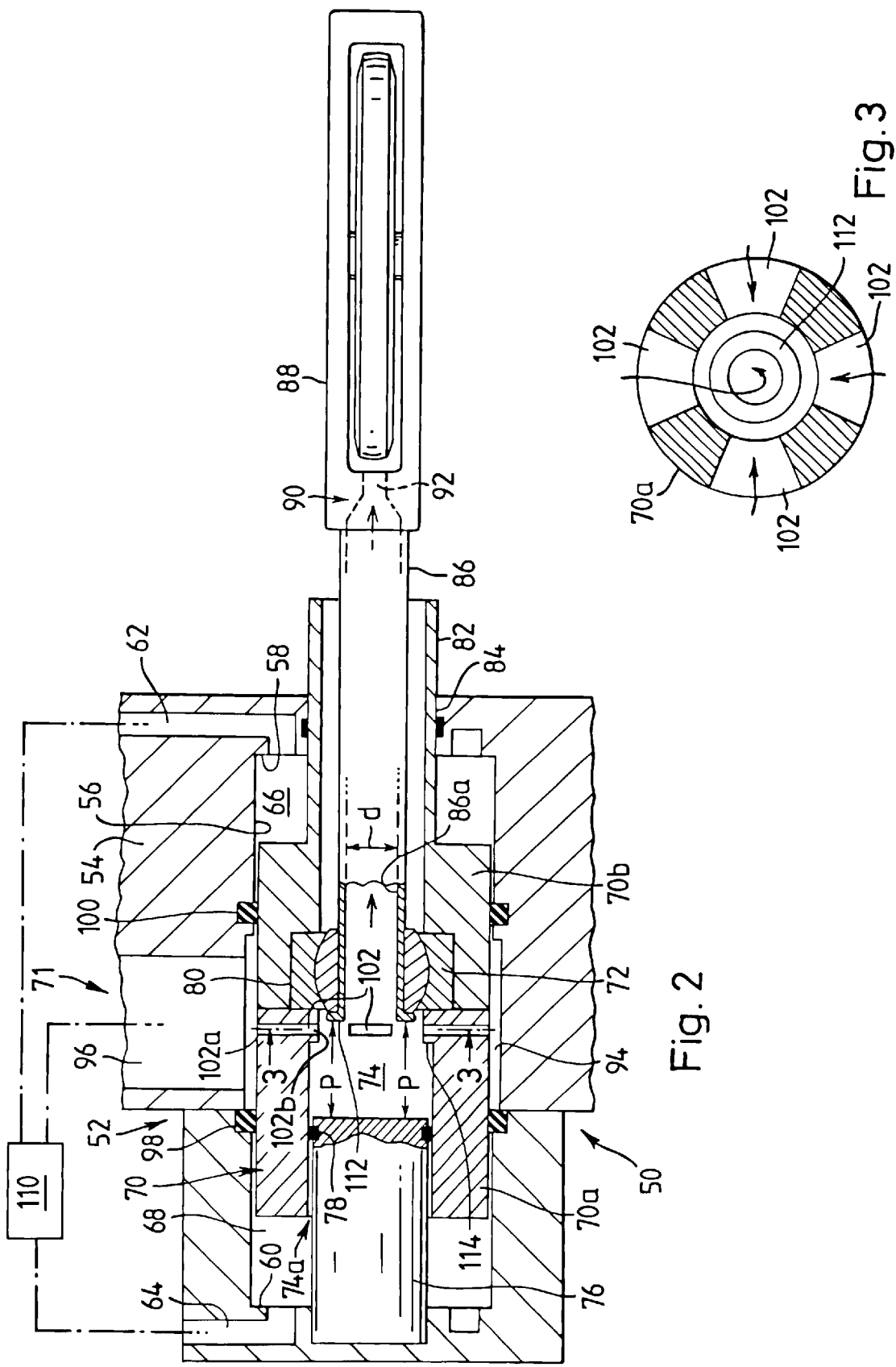

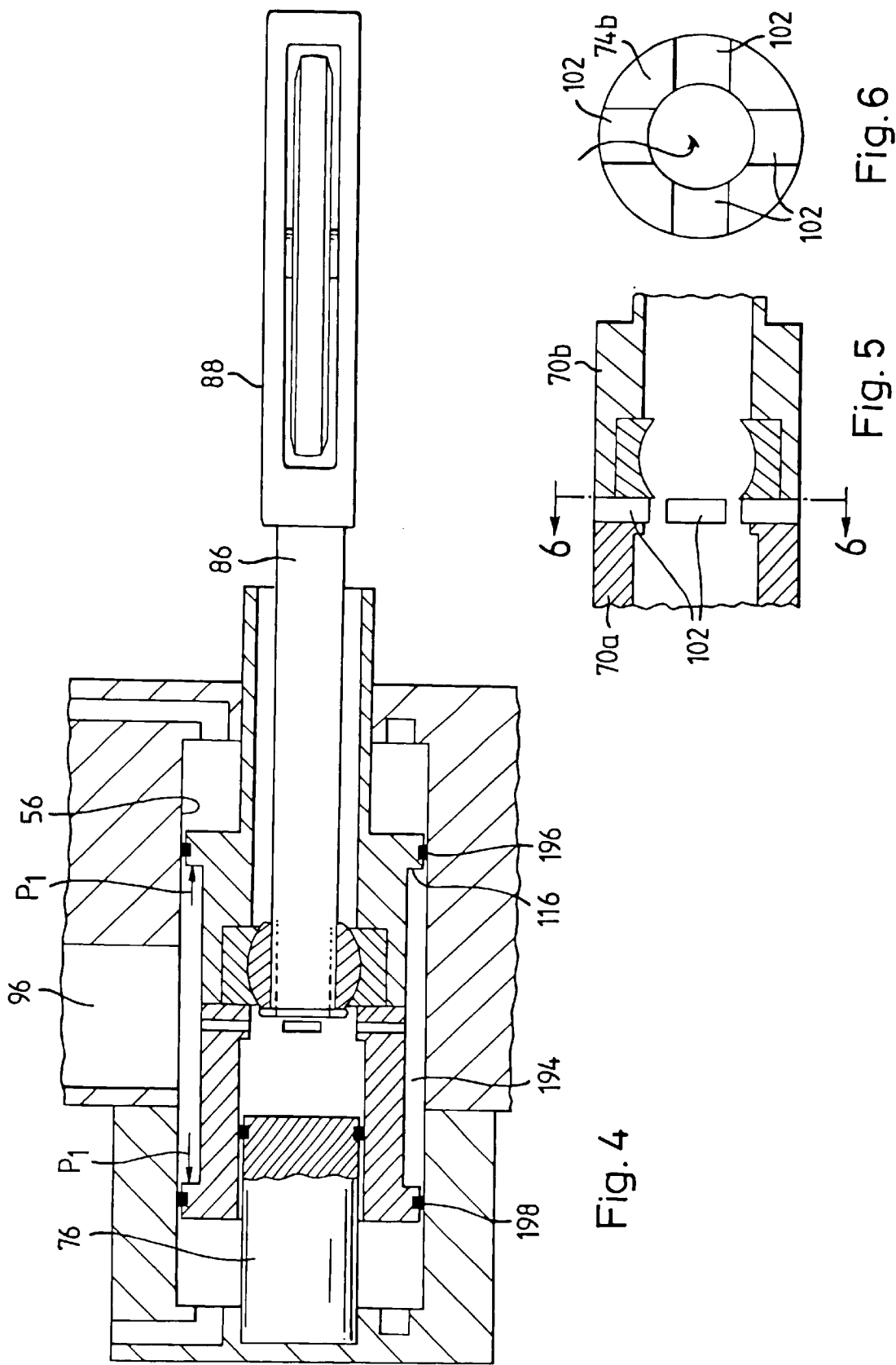

COOLING FLUID SUPPLY TO HYDRAULICALLY ACTUATED ROLLERS IN A CONTINUOUSLY-VARIABLE-RATIO TRANSMISSION

This is a continuation of PCT application PCT/GB99/01273, filed Apr. 26, 1999, the entire content of which is hereby incorporated by reference in this application.

BACKGROUND OF THE INVENTION

1. Field of the Invention

This invention relates to the supply of cooling fluid to the rollers of hydraulically actuated roller assemblies. It relates especially, but not exclusively, to the supply to rollers that must rotate at high speed and under high loading from two opposed surfaces which contact the roller at opposite ends of a diameter, so squeezing the roller between them. The invention thus relates particularly to the rollers used in the variators of the toroidal-race rolling traction type.

2. Discussion of Prior Art

This invention has particular, though not exclusive, application to continuously-variable-ratio transmissions ("CVT's") of the toroidal-race rolling-traction type, and in particular to roller-control units of the kind by which the orientation of the traction-transmitting rollers may be controlled hydraulically, by means of the direct connection of the carriage of each roller to a piston, movable within a hydraulic cylinder connected to a controlled source of variable fluid pressure.

In such variators, the cooling of the discs and rollers and of the traction fluid is always an important consideration. As is well understood in the art, the fluid must always be present in the form of a thin film between the rollers and the toroidal races of the discs, to prevent metal-to-metal contact, so that traction is transmitted between discs and rollers by way of shear generated within the thin film. In practice the waste heat generated within the film, in an instant during which it is transmitting traction, is quickly dissipated an instant later when that particular volume of fluid will have moved clear of the "nip" between race and rollers. As to the discs, the heat conductivity of the hardened steel they are made of is not particularly high. However, the total area of each disc is high compared with the areas of instantaneous contact with its co-operating rollers, and the location of those areas of contact tends to change frequently because the ratio transmitted by the variator is also continually changing. Conventional lubrication techniques are therefore usually sufficient to prevent overheating of the discs.

With the rollers it is different, however: the heat input is always concentrated at the circumference. The concentration of the heat input is aggravated by the fact that the roller rim is, in practice, rounded to a cross-radius, so that the instantaneous "contact" between roller and race, by way of the intervening film of traction fluid, tends to be small when measured in a direction parallel to the roller axis.

British patent application number GB-A-2282196 discloses a roller assembly for a CVT in which cooling fluid is provided to the roller surface via a hollow roller support stem. The fluid is passed through a single outlet positioned opposite the roller outer surface and bathes the roller in cooling fluid.

International application no. PCT GB 97/37156 discloses, as shown in FIG. 1 of the accompanying drawings, an improved arrangement for the supply of cooling fluid to rollers in a CVT system. A roller assembly 10 comprises a roller 12 with bearings 14, 16, mounting the roller 12 for rotation on a central shaft 18 in a supporting carriage 20. The roller assembly 10 is secured to a hollow stem 22 which in turn is supported in spherical joint 24 within a piston 26 positioned within a cylinder 28. The cylinder and piston between themselves define a chamber having two portions 30a, 30b. Movement of the piston 26 is achieved by varying the pressure of hydraulic fluid supplied to each chamber 30a, 30b in a manner well known to those skilled the art and therefore not described in detail herein. Cooling fluid is supplied from a source thereof 32 to passage 34 extending along the stem 22 and thence to a pair of outlets 36 before being sprayed onto the surface of roller 12. Before passing into passageway 34 the lubricating fluid enters a chamber 38 into which the proximal end 40 of the piston/stem assembly 26,34 extends. As a consequence of this arrangement, it will be appreciated that lubricating fluid pressure will act against proximal end 40 and this might affect the accurate positioning of the roller assembly 10. A small movement effect will also be present due to the existence of surfaces 42 within passageway 34. In this arrangement, the hydraulic fluid used to control the piston position is supplied to chamber 30a, 30b from the same source 32 as that used to supply lubrication fluid to the roller.

Whilst the above-discussed arrangements provides a perfectly adequate roller control system, problems can arise in connection with the efficient supply of cooling fluid to the roller, particularly when its flow path is through the roller actuation piston. In such cases a small bore supply is often used and multiple bends are encountered before the fluid reaches the roller. The combination of these two features can cause undesirable pressure losses and reduce the effectiveness of the cooling system.

SUMMARY OF THE INVENTION

It is an object of the present invention to provide a roller control unit which reduces and possibly eliminates the problems associated with the above-mentioned control unit.

Accordingly, the present invention provides a roller control unit for a continuously-variable-ratio transmission comprises:
  a cylinder having a cylinder wall; and
  a piston, within the cylinder and being axially translatable therealong;
  a chamber, formed by said cylinder and piston for receiving hydraulic fluid which, in operation causes said piston to move between first and second axially displaced positions; and
  a lubrication supply passage, for supplying lubrication to a roller connected to said piston for movement therewith; characterised in that said lubrication supply passage comprises a chamber formed between said piston and cylinder wall and one or more radially extending passageways through said piston, each having a first end in fluid communication with said chamber and having a second end in communication with said roller.

Preferably, said chamber comprises a recess in the cylinder wall.

Conveniently, said chamber comprises an annular recess.

Advantageously, the control unit further includes seal means in said cylinder wall at each axial end of said chamber and acting between the cylinder wall and said piston.

Alternatively, the chamber may comprise a recess in the outer surface of the piston.

Conveniently, the alternative chamber may comprise an annular recess.

In the alternative arrangement, the roller control unit further includes seal means at axially displaced positions on the piston and acting between the piston and the cylinder wall.

Preferably, the piston comprises a hollow piston having a cavity therein in which one or more of the second ends of said one or more passageways are in fluid communication therewith.

Communicatively, the roller control unit further includes a roller support stem having an axially extending lubrication supply duct and in which said duct includes a first end in fluid communication with said cavity for receiving lubrication fluid therefrom.

Preferably, the cavity comprises an open ended cavity having an open end and said unit further includes a plug fixed relative to said cylinder and extending into said open end of said piston, thereby to define said cavity between itself and an end face of said piston.

Advantageously, said plug is a sliding fit within said cavity and, in operation, said piston slides over said plug thereby to define a cavity of variable volume.

Advantageously, said chamber is formed at least in part by said plug.

In a preferred arrangement the chamber comprises two portions, said first portion being bounded by the cylinder and piston and the second portion being bounded by said cylinder, piston and a plug fixed relative to said cylinder and extending into an axially extending cavity within said piston.

BRIEF DESCRIPTION OF THE DRAWINGS

The present invention will now be more particularly described by way of example only with reference to the accompanying drawings, in which:

FIG. 2 is a cross sectional view of a roller control unit in accordance with the present invention;

FIG. 3 is a cross sectional view taken in the direction of arrows 3—3 of FIG. 2;

FIG. 4 is a cross-sectional view of an alternative piston arrangement;

FIG. 5 is a part cross-sectional view of an alternative passageway arrangement;

FIG. 6 is a cross-sectional view taken in the direction of arrows 6—6 in FIG. 5;

DETAILED DISCUSSION OF PREFERRED EMBODIMENTS

Figure 1:
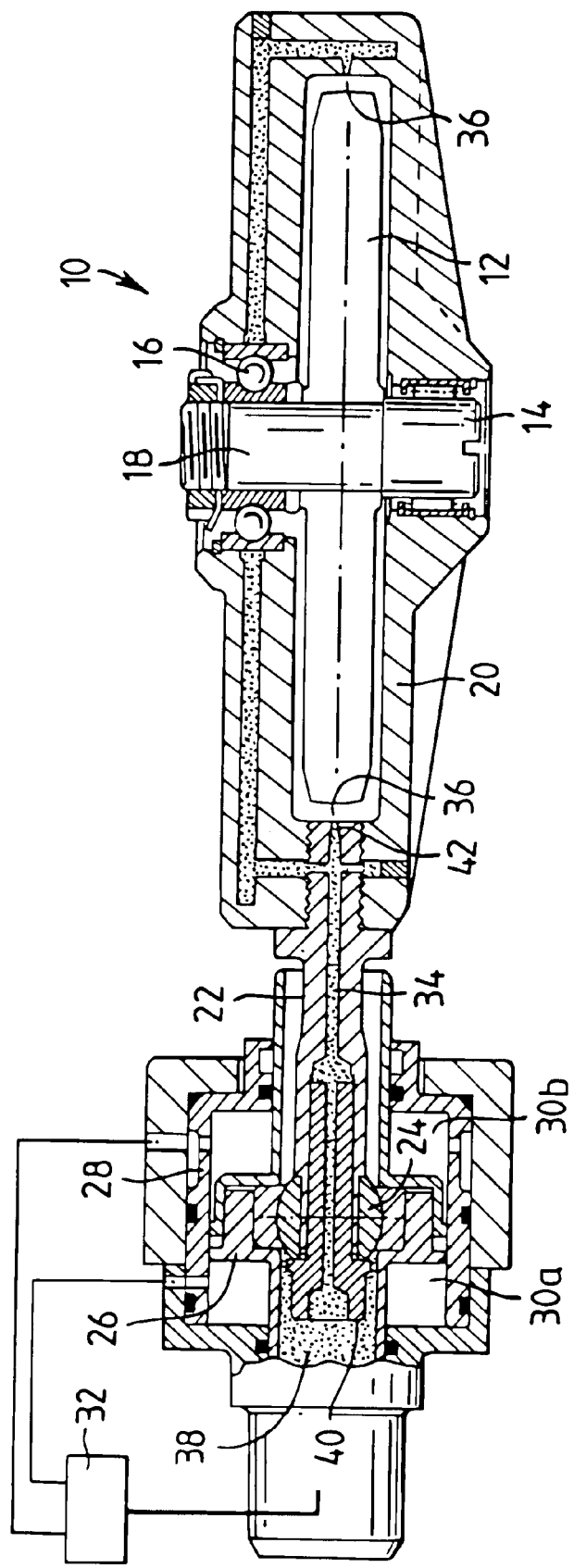
FIG. 1 is a cross sectional view of a prior known roller control unit.

Referring now to FIG. 2, a roll control unit 50 according to the present invention and suitable for use with a continuously-variable-ratio transmission comprises a piston and cylinder arrangement shown generally at 52. The cylinder itself 54 comprises an axially extending cylinder wall 56 and end walls 58, 60 having hydraulic supply ducts 62, 64 provided therein for supplying hydraulic fluid to chambers 66, 68 formed between said cylinder 54 and the piston itself 70. In this particular example, the piston 70 comprises a two-part piston 70a, 70b having a rose bearing or spherical joint 72 sandwiched there between. Other arrangements, however, present themselves to a person skilled the art. The first portion 70a of said piston comprises a hollow piston portion having a cavity 74 formed therein and which, in operation, receives a plug 76 fixed relative to said cylinder 54. The plug 76 extends into an open end of said piston, thereby in combination with said first piston portion to define said cavity 74. A seal 78 is provided between the plug 76 and first piston portion 70a in order to prevent the fluid escaping from said chamber 74. The second portion 70b of said piston includes a recess 80 in which said rose bearing 72 is situated. An extension portion 82 of said second piston portion 70b extends along the said cylinder and co-operates with an outlet 84 in said end wall 58 in order to define an inner boundary for chamber 66. A roller support stem 86 extends between the inner portion of said rose bearing 72 and a roller assembly shown generally at 88 in a manner well known in the prior art. The stem effectively comprises a tube having as large an internal diameter d as possible in order to minimise fluid drag there through. An outlet end 90 of said stem includes an outlet 92 which is itself as large as practical.

In the arrangement of FIG. 2, the cylinder 54 includes a chamber 94 formed at an annular or part annular recess in the wall 56 and is in a fluid flow communication with a large diameter lubrication supply duct 96 for receiving lubrication fluid as and when necessary. Seals 98, 100 provided at axially displaced positions within said cylinder wall 56 act to define the outer boundaries of chamber 94 and sealed between said cylinder wall 56 and piston 70. One or more radially extending passageways 102 extend through the piston 70 and have a first end 102a in flow communication with chamber 94 and a second end 102b in flow communication with said chamber 74 which is in turn in communication with the outlet 92 of roller assembly 88.

Operation of the roll assembly is conventional and requires one simply to vary the pressures within chamber 66, 68 so as to move the piston 70 and roll assembly 88 to any desired position. For this purpose, the source of pressurised hydraulic fluid is provided at 110 and suitable ducting supplies said fluid to inlet 62, 64 as and when required. Supply of cooling fluid to the roller assembly 88 is, however, somewhat unconventional and requires the lubrication to be passed from source 110 to chamber 74 via inlet 96. The inlet is provided with as large a wall diameter as possible so as to minimise any flow resistance therethrough. Once fluid is within chamber 94 it passes through passageway 102 and into chamber 74 before passing along the stem duct 86a and being directed onto the roller itself. It will be appreciated that by minimising the surface area of proximal end 112 of the stem 86, maximising the diameter d and the size of outlet 92, it will be possible to minimise any effect that a variation in lubrication pressure might have on the piston position. Additionally, it will be appreciated that by the providing large bore cooling fluid supply ducts 96, any surface resistance and, hence, pressure losses within the supply ducting is reduced quite significantly relative to that of the prior art which employs small diameter supply ducts which are often directed through multiple bends before reaching their final destination. When the fluid passes down such small diameter ducting, surface resistance causes a significant pressure drop and this problem is compounded by a further pressure drop resulting from sharp bends which are often featured in the prior art. The present invention aims at minimising such losses whilst still providing an adequate supply of cooling fluid to the roller. Pressure drop effects may be further compounded by fluid viscosity which increases with very low ambient temperatures i.e. −30 to −40 degrees.

During operation of the above-mentioned piston assembly, the capacity of chamber 74 will vary in accordance with the piston's position. In order to ensure that cooling fluid flow is maintained at all piston positions passageways 102 are arranged to enter the chamber close to proximal end 112 and between it and an end stop surface 114 provided on first piston portion 70a. At no time does plug 76 protrude beyond surface 114 and so a minimum chamber volume is maintained at all times. In addition to this arrangement, it will be appreciated that the inlet to passageways 102 remain within the confines of chamber 94 regardless of the actual position of the position 70. Consequently, the flow of cooling fluid to the roller remains uninterrupted during piston movement.

Referring briefly to FIG. 3 which is a cross-section view taken in the direction of arrows 3—3 in FIG. 2, it will be appreciated that passageways 102 could comprise radially extending slots as shown or may comprise simple drillings as well known in the art and therefore not shown or described further herein. The advantage of the slotted arrangement resides in the fact that rotation of the roller assembly may be accommodated without interrupting or significantly affecting the supply of cooling fluid to the said roller.

Turning now to FIG. 4, it will be appreciated that the chamber 94 may be replaced by a chamber 194 provided by forming a recess 116 within the piston assembly itself. The ends of said chamber are provided with seals 196, 198 mounted in the piston body and slidable along the cylinder wall 56 in order to seal said cavity relative to said cylinder. Operation of this arrangement is identical to that described above save that lubrication fluid entering chamber 194 will have a pressurising effect $P_1$ on either end of the piston but, as these forces will balance each other this has no effect on the overall position of the piston itself. Advantage of this arrangement resides in the fact that the cylinder wall may comprise a smooth wall arrangement as presently known in the art.

Turning now briefly to FIG. 5, it will be appreciated that the passageway arrangement 102 and piston assembly 70 may be further altered so as to increase the size of the coolant passageways. In this particular arrangement the passageways are formed as slots in an end face 74b if the second portion 74. These slots are best seen in FIG. 6 and can be formed by making a straight cutting pass which machines two passageways in one pass. A further advantage resides in the fact hat such passageways do not taper towards the outlet end 102b and, hence, a more even flow of fluid is achieved and friction losses reduced.

Figure 7:
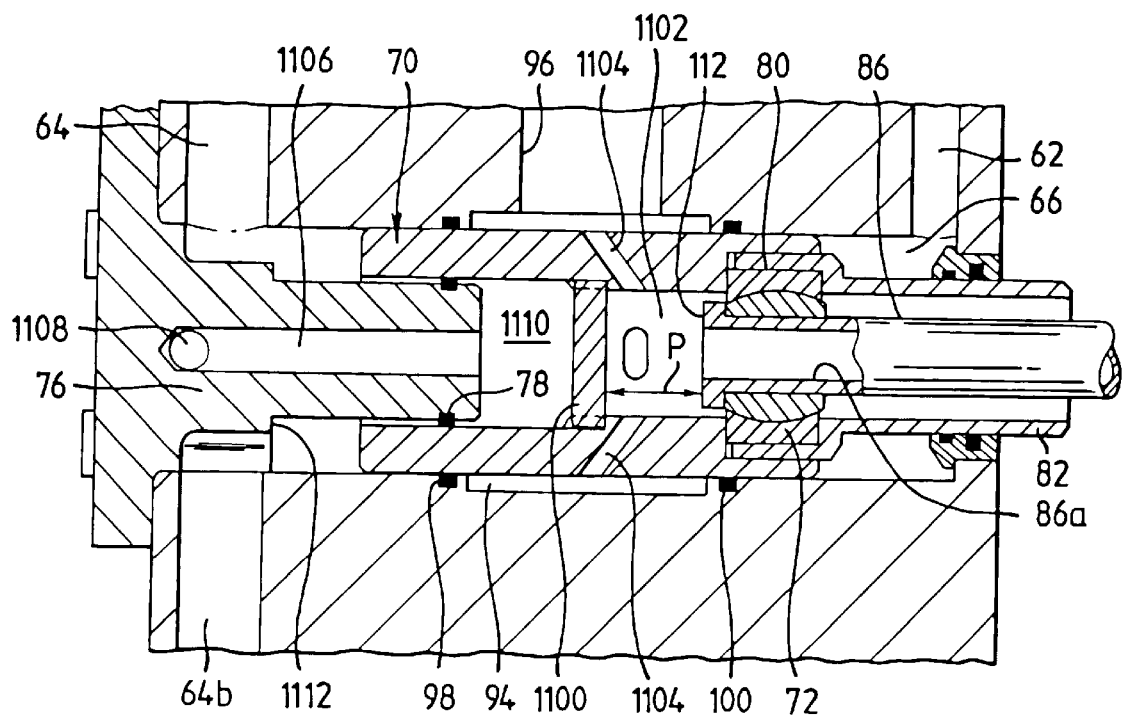
FIG. 7 is a cross-sectional view of a still further piston arrangement, in which the cross-section of the plug 76 is taken in the direction of arrows 7—7 in FIG. 8.

A further form of the present invention is shown in FIG. 7. In this arrangement a plug 1100 is inserted in the piston such that it creates a chamber 1102 between itself and the end 112 of stem 86. The plug is firmly secured by conventional means to said piston 70 such that it moves therewith as and when the roller position is altered. The radially extending passageways 1104 supply said chamber 112 with lubrication fluid in the manner already described with reference to the earlier embodiments. In this particular example, passageways 1104 are shown angled relative to those of the earlier embodiments thereby to ensure the inlet thereto remains within chamber 94 regardless of piston position. It will, however, be appreciated that these passageways maybe provided in the form as shown in FIGS. 2 and 3 so long as passageway 94 is extended to suit. The plug 76 still extends into opening 74a in the piston but is now provided with a vent passage 1106 which communications with outlet 1108 which is in turn in direct contact with a sump (not shown) or some other suitable reservoir of fluid at lower pressure. The particular example shown is a master cylinder and, consequently, the cross-section includes an outlet passage 64b from chamber 68 which communicates with similar chambers provided on the slave pistons (not shown). The outlet from chamber 66 is not shown in this drawing.

Operation of the FIG. 7 embodiment is similar to that described above save for the fact that lubrication fluid supplied by inlet 1104 enters chamber 112 and any pressure within the chamber reacts against end face 112 and plug 1100 rather than between end face 112 and plug 76. Consequently, any pressure which the lubrication fluid might exert on end face 112 and which previously might affect the position of the roller now has an equal and opposite force also acting on a component which is integral with the piston 70. Consequently, there will be no resultant force which might influence the roller position and this design improves on the above-discussed arrangement. It will be appreciated that the piston 70 will still slide over plug 76 and that a chamber 1110 is created between plug 76 and plug 1100. This chamber must be vented in order to facilitate movement of the plug and this is achieved by passageways 1106 and 1108 mentioned previously. If necessary, an end stop 1112 may be provided on plug 76 so that the axial displacement of piston 70 is controlled within desired limits, thereby to ensure lubrication fluid is always supplied to the roller.

Figure 8:
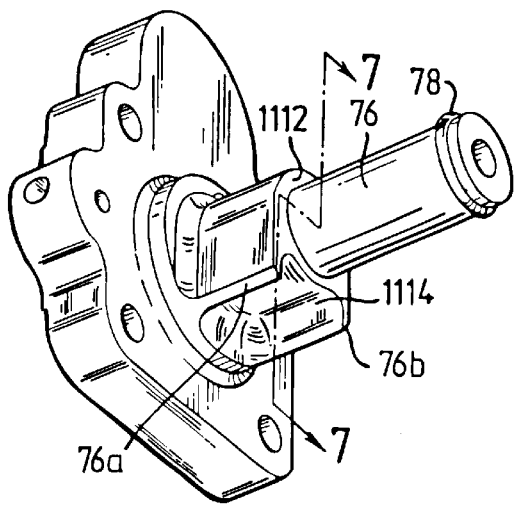
FIGS. 8 and 9 are more detailed views of the plug.
Figure 9:
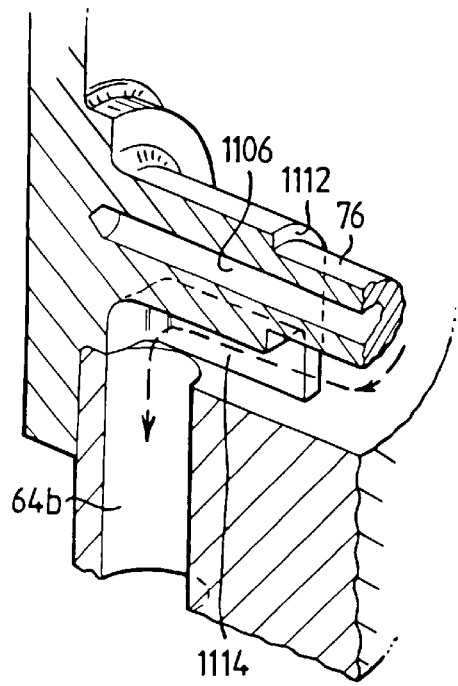

Referring briefly to FIGS. 7 and 8 in combination, it will be appreciated that plug 76 includes shield portions 76a, 76b which extend downwardly towards outlet 64b and shields this outlet whenever piston 70 abuts end stop 1112. In normal operation, hydraulic fluid is supplied by inlet 64 and passes between the end of piston 70 and end stop 1112 before passing into the opening 1114 formed between walls 76a, 76b and thence into outlet 64b and on to any slave cylinders. As the piston reaches end stop 1112 it obturates the entrance to opening 1114 and prevents any further fluid passing to outlet 64b. This arrangement provides the piston with an hydraulic end stop due to the pressure the hydraulic fluid exerts on the piston 70 during its translation towards end stop 1112. Actuation of the master piston 70 and any slave pistons is achieved by simply increasing the pressure at inlet 64 which then moves piston 70 away from inlet 1114 thus allowing the passage of hydraulic fluid to the remaining pistons.

What is claimed is:

1. A roller control unit for a continuously-variable-ratio transmission comprises:
    a cylinder having a cylinder wall;
    a piston having a piston wall and located within the cylinder and being axially translatable therealong;
    a chamber, formed by said cylinder and piston for receiving said fluid which, in operation, causes said piston to move between first and second axially displaced positions; and
    a fluid supply passage, for supplying fluid to a roller connected to said piston for movement therewith; wherein said fluid supply passage comprises a further chamber formed between said piston wall and cylinder wall and at least one radially extending passageway through said piston, said at least one passageway having a first end in fluid communication with said further chamber and having a second end in communication with said roller.

2. A roller control unit as claimed in claim 1 in which the piston comprises a hollow piston having a cavity therein and in which one or more of the second ends of said at least one passageway is in flow communication therewith.

3. A roller control unit as claimed in claim 1 in which said further chamber comprises a recess in said cylinder wall.

4. A roller control unit as claimed in claim 1 in which said further chamber comprise a recess in the outer surface of said piston.

5. A roller control unit for a continuously-variable-ratio transmission comprises:

a cylinder having a cylinder wall;

a piston, within the cylinder and being axially translatable therealong;

a chamber, formed by said cylinder and piston for receiving fluid which, in operation, causes said piston to move between first and second axially displaced positions; and a fluid supply passage, for supplying said fluid to a roller connected to said piston for movement therewith; wherein said fluid supply passage comprises a further chamber formed between said piston and cylinder wall and at least one radially extending passageway through said piston, said at least one passageway having a first end in fluid communication with said further chamber and having a second end in communication with said roller in which said further chamber comprises a recess in said cylinder wall.

6. A roller control unit as claimed in claim 5, further including seal means in said cylinder wall at each axial end of said further chamber and acting between the cylinder wall and said piston.

7. A roller control unit for a continuously-variable-ratio transmission comprises:

a cylinder having a cylinder wall;

a piston, within the cylinder and being axially translatable therealong;

a chamber, formed by said cylinder and piston for receiving fluid which, in operation, causes said piston to move between first and second axially displaced positions; and a fluid supply passage, for supplying said fluid to a roller connected to said piston for movement therewith; wherein said fluid supply passage comprises a further chamber formed between said piston and cylinder wall and at least one radially extending passageway through said piston, said at least one passageway having a first end in fluid communication with said further chamber and having a second end in communication with said roller in which said further chamber comprise a recess in the outer surface of said piston.

8. A roller control unit as claimed in claim 7 further including seal means at axially displaced position on said piston and acting between the piston and cylinder wall.

9. A roller control unit for a continuously-variable-ratio transmission comprises:

a cylinder having a cylinder wall;

a piston, within the cylinder and being axially translatable therealong;

a chamber, formed by said cylinder and piston for receiving fluid which, in operation, causes said piston to move between first and second axially displaced positions; and a fluid supply passage, for supplying said fluid to a roller connected to said piston for movement therewith; wherein said fluid supply passage comprises a further chamber formed between said piston and cylinder wall and at least one radially extending passageway through said piston, said at least one passageway having a first end in fluid communication with said further chamber and having a second end in communication with said roller, wherein the piston comprises a hollow piston having a cavity therein and in which one or more of the second ends of said at least one passageway is in flow communication therewith and further including a roller support stem having an axially extending fluid supply duct and in which said duct includes a first end in fluid communication with said cavity for receiving fluid therefrom.

10. A roller control unit for a continuously-variable-ratio transmission comprises:

a cylinder having a cylinder wall;

a piston, within the cylinder and being axially translatable therealong;

a chamber, formed by said cylinder and piston for receiving fluid which, in operation, causes said piston to move between first and second axially displaced positions; and a fluid supply passage, for supplying said fluid to a roller connected to said piston for movement therewith; wherein said fluid supply passage comprises a further chamber formed between said piston and cylinder wall and at least one radially extending passageway through said piston, said at least one passageway having a first end in fluid communication with said further chamber and having a second end in communication with said roller, wherein the piston comprises a hollow piston having a cavity therein and in which one or more of the second ends of said at least one passageway is in flow communication therewith in which said cavity comprises an open ended cavity having an open end and said unit further includes a plug fixed relative to said cylinder and extending into said open end of said piston, thereby to define said cavity between itself an end face of said piston.

11. A roller control unit as claimed in claim 10 in which said plug is a sliding fit with said cavity and, in operation, said piston slides over said plug thereby to define a cavity of variable volume.

12. A roller control unit as claimed in claim 11 in which said cavity is formed at least in part by said plug.

13. A roller control unit as claimed in claim 12 and in which said chamber comprise two portions, said first portion being bounded by the cylinder and piston and the second portion being bounded by said cylinder, piston and a plug fixed relative to said cylinder and extending into said axially extending cavity within said piston.

14. A roller control unit for a continuously-variable-ratio transmission comprises:

a cylinder having a cylinder wall;

a piston, within the cylinder and being axially translatable therealong;

a chamber, formed by said cylinder and piston for receiving fluid which, in operation, causes said piston to move between first and second axially displaced positions; and a fluid supply passage, for supplying fluid to a roller connected to said piston for movement therewith; wherein said fluid supply passage comprises a further chamber formed between said piston and cylinder wall and at least one radially extending passageway through said piston, said at least one passageway having a first end in fluid communication with said further chamber and having a second end in communication with said roller in which said piston includes a plug portion which defines a chamber between itself and an end face of the roller stem and a chamber formed therebetween for receiving fluid.

15. A roller control unit as claimed in claim 14 in which the piston comprises a hollow piston having a cavity therein and in which a plug fixed relative to said cylinder extends into an open end for said piston, thereby to define the cavity between itself and plug and in which said cavity is vented, thereby to permit the escape of any fluid contained therein.

16. A roller control unit as claimed in claim 15 in which the plug includes a vent passage for venting said cavity to a lower pressure.

17. A roller control unit for a continuously-variable-ratio transmission comprises:

a cylinder having a cylinder wall;

a piston, within the cylinder and being axially translatable therealong;

a chamber, formed by said cylinder and piston for receiving fluid which, in operation, causes said piston to move between first and second axially displaced positions; and a fluid supply passage, for supplying said fluid to a roller connected to said piston for movement therewith; wherein said fluid supply passage comprises a further chamber and at least one radially extending passageway through said piston, said at least one passageway having a first end in fluid communication with said further chamber and having a second end in communication with said roller, said further chamber comprising a substantially constant volume chamber during movement of said piston.

\* \* \* \* \*